US008913834B2

(12) United States Patent
Hayase

(10) Patent No.: US 8,913,834 B2
(45) Date of Patent: Dec. 16, 2014

(54) ACOUSTIC SIGNAL CORRECTOR AND ACOUSTIC SIGNAL CORRECTING METHOD

(75) Inventor: Ken Hayase, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 379 days.

(21) Appl. No.: 13/352,120

(22) Filed: Jan. 17, 2012

(65) Prior Publication Data

US 2012/0120319 A1    May 17, 2012

Related U.S. Application Data

(63) Continuation of application No. 12/174,551, filed on Jul. 16, 2008, now abandoned.

(30) Foreign Application Priority Data

Aug. 2, 2007    (JP) .................................. 2007-202321

(51) Int. Cl.
*G06K 9/46* (2006.01)
*G06K 9/66* (2006.01)
(Continued)

(52) U.S. Cl.
CPC ............ *G11B 27/34* (2013.01); *H04N 21/4104* (2013.01); *H04N 21/47* (2013.01); *H04N 21/8455* (2013.01); *G06F 17/30793* (2013.01); *H04N 21/4147* (2013.01); *H04N 21/488* (2013.01); *G11B 27/105* (2013.01); *G06F 3/0482* (2013.01); *G06F 17/30852* (2013.01); *H04N 5/775* (2013.01); *H04N 21/4325* (2013.01); *H04N 21/8153* (2013.01); *G11B 27/28* (2013.01); *H04N 5/76* (2013.01); *H04N 5/765* (2013.01); *H04N 9/8227* (2013.01); *H04N 21/4334* (2013.01)
USPC ........................................................ 382/190

(58) Field of Classification Search
USPC .................................................. 382/118, 190
See application file for complete search history.

(56) References Cited

U.S. PATENT DOCUMENTS 6,711,587 B1    3/2004   Dufaux
7,630,986 B1    12/2009  Herz et al.
(Continued)

FOREIGN PATENT DOCUMENTS

JP    10-234004      9/1998
JP    2001-309269    11/2001

OTHER PUBLICATIONS

U.S. Appl. No. 12/174,551, Notice of Allowance, mailed Oct. 17, 2011.

*Primary Examiner* — John Strege
(74) *Attorney, Agent, or Firm* — Blakely, Sokoloff, Taylor & Zafman LLP

(57) ABSTRACT

According to one embodiment, an electronic apparatus comprises (i) an image extraction module configured to extract representative images from a plurality of frames which constitute video content data, and to output time stamp information indicative of time points at which the extracted representative images appear, and (ii) an image list display process module configured to display a list of the extracted representative images on a two-dimensional display area. The area includes image display areas which are divided by columns, a plurality of time zones, and the image list display process module is configured to display, based on the time stamp information corresponding to each of the extracted representative images, the representative images, which belong to the time zone allocated to each column.

12 Claims, 9 Drawing Sheets

(51) Int. Cl.
*H04N 21/845* (2011.01)
*G06F 17/30* (2006.01)
*H04N 21/4147* (2011.01)
*G11B 27/10* (2006.01)
*G06F 3/0482* (2013.01)
*H04N 21/432* (2011.01)
*H04N 21/81* (2011.01)
*G11B 27/28* (2006.01)
*H04N 5/76* (2006.01)
*H04N 9/82* (2006.01)
*G11B 27/34* (2006.01)
*H04N 21/433* (2011.01)
*H04N 21/41* (2011.01)
*H04N 21/47* (2011.01)
*H04N 21/488* (2011.01)
*H04N 5/775* (2006.01)
*H04N 5/765* (2006.01)

(56) References Cited

U.S. PATENT DOCUMENTS

| | | |
|---|---|---|
| 7,986,819 B2 | 7/2011 | Momosaki |
| 2006/0110128 A1 | 5/2006 | Dunton et al. |
| 2008/0080743 A1* | 4/2008 | Schneiderman et al. ..... 382/118 |
| 2011/0170749 A1 | 7/2011 | Schneiderman et al. |

* cited by examiner

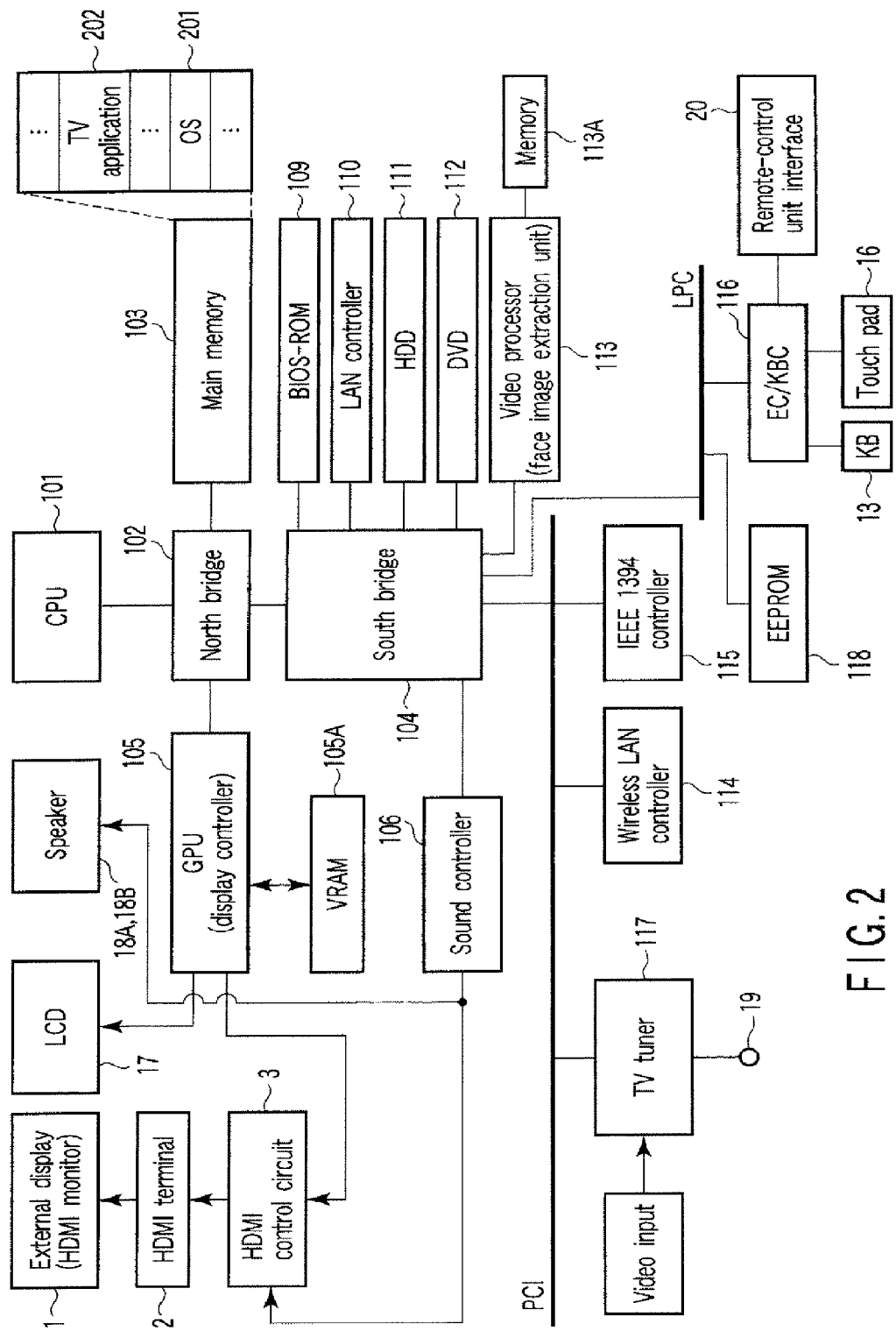
F I G. 2

ACOUSTIC SIGNAL CORRECTOR AND ACOUSTIC SIGNAL CORRECTING METHOD

CROSS-REFERENCE TO RELATED APPLICATIONS

This application is a continuation application of U.S. application Ser. No. 12/174,551, filed Jul. 16, 2008, now abandoned, which is based upon and claims the benefit of priority from Japanese Patent Application No. 2007-202321, filed Aug. 2, 2007, the entire contents of which are incorporated herein by reference.

BACKGROUND

1. Field

One embodiment of the invention relates to an electronic apparatus and a face image display method for displaying a face image which appears in video content data.

2. Description of the Related Art

In general, an electronic apparatus, such as a video recorder or a personal computer, is capable of recording and playing back various video content data such as TV broadcast program data. In this case, although tiles are added to the respective video content data items stored in the electronic apparatus, it is difficult for a user to understand, from the title alone, what kind of content each video content data contains. In order to understand the content of each video content data, it is thus necessary to play back the video content data. In the case of playing back video content data of a long total time, however, even if a quick forward function or the like is used, a great deal of time is needed.

Jpn. Pat. Appln. KOKAI Publication No. 2001-309269 discloses an apparatus having an appearing person list display function. This apparatus has a function of displaying, in an arranged order, the face images of persons appearing in video content as a list of persons appearing in the video content.

However, even if the list of persons is merely displayed, the user cannot understand in which of time zones of the video content data item such persons appear. For example, the user, in some cases, wishes to selectively play back video content of a time zone in which a person (or persons), in whom the user is interested, appears.

It is necessary, therefore, to realize a novel function for presenting which persons appear in which time zones in the whole video content data, and in what order of appearance.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing an example of the system configuration of the electronic apparatus according to the embodiment;

DETAILED DESCRIPTION

Various embodiments according to the invention will be described hereinafter with reference to the accompanying drawings. In general, according to one embodiment of the invention, an electronic apparatus includes a face image extraction unit and a face image list display process unit. The face image extraction unit is configured to extract face images of persons from a plurality of frames which constitute video content data, and to output time stamp information indicative of time points at which the extracted face images appear. The face image list display process unit is configured to display a list of the extracted face images on a two-dimensional display area. The two-dimensional display area includes a plurality of face image display areas which are arranged in a matrix including a plurality of rows and a plurality of columns, a plurality of time zones each having the same time length, which are obtained by dividing a total time length of the video content data by the number of the plurality of columns at equal intervals, are allocated to the plurality of columns, respectively. The face image list display process unit displays, based on the time stamp information corresponding to each of the extracted face images, the face images, which belong to the time zone allocated to each column, on the face image display areas of each column, by arranging the face images in an order of time of appearance of the face images.

Figure 1:
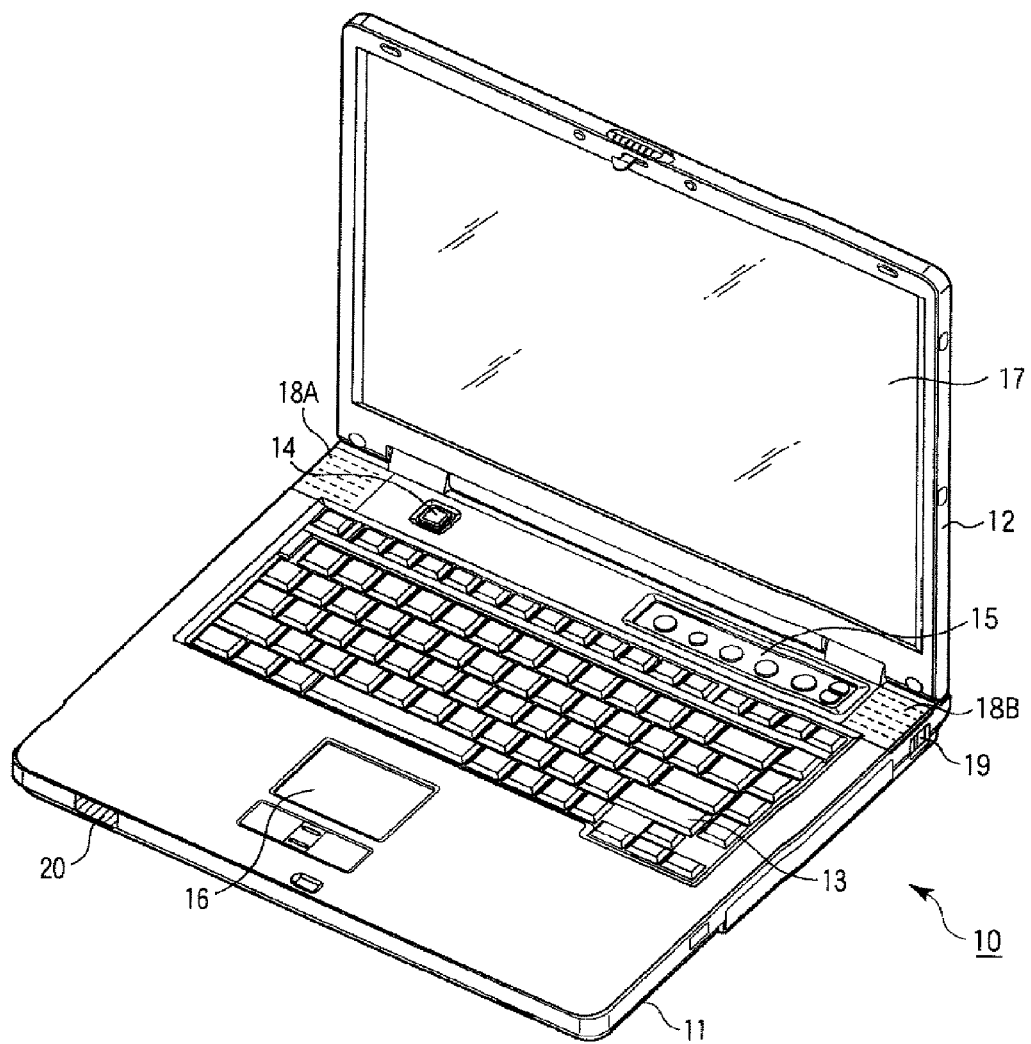
FIG. 1 is an exemplary perspective view showing an example of the external appearance of an electronic apparatus according to an embodiment of the invention.

To begin with, referring to FIG. 1 and FIG. 2, the structure of an electronic apparatus according to an embodiment of the invention is described. The electronic apparatus according to this embodiment is realized, for example, by a notebook portable personal computer 10 functioning as an information processing apparatus.

The personal computer 10 is capable of recording and playing back video content data, such as broadcast program data and video data which is input from an external device. Specifically, the personal computer 10 has a TV function for executing viewing/listening and recording of broadcast program data which is broadcast by a TV broadcast signal. This TV function is realized, for example, by a TV application program which is preinstalled in the personal computer 10. In addition, the TV function includes a function of recording video data which is input from an external AV device, and a function of playing back recorded video data and recorded broadcast program data.

Further, the personal computer 10 has a face image list display function for displaying, for instance, a list of face images of persons who appear in video content data, such as video data and broadcast program data, which is stored in the personal computer 10. This face image list display function is implemented, for example, as one of functions included in the TV function. The face image list display function is one of video indexing functions for presenting, for instance, outlines of video content data to a user. This face image list display function can present, to the user, which persons appear in which time zones in the whole video content data, and in what order of appearance.

FIG. 1 is a perspective view that shows the state in which a display unit of the computer 10 is opened. The computer 10 comprises a computer main body 11 and a display unit 12. A display device that is composed of a TFT-LCD (Thin Film Transistor Liquid Crystal Display) 17 is built in the display unit 12.

The display unit 12 is attached to the computer main body 11 such that the display unit 12 is freely rotatable between an open position where a top surface of the computer main body 11 is exposed, and a closed position where the top surface of the computer main body 11 is covered. The computer main body 11 has a thin box-shaped casing. A keyboard 13, a power button 14 for powering on/off the computer 10, an input operation panel 15, a touch pad 16 and speakers 18A, 18B are disposed on the top surface of the computer main body 11.

The input operation panel 15 is an input device that inputs an event corresponding to a pressed button. The input operation panel 15 has a plurality of buttons for activating a plurality of functions. The buttons include operation buttons for controlling a TV function (viewing/listening, recording, and playback of recorded broadcast program data/video data). In addition, a remote-control unit interface unit 20, which executes communication with a remote-control unit that controls the TV function of the computer 10, is provided on a front surface of the computer main body 11. The remote-control interface unit 20 is composed of, e.g. an infrared signal receiving unit.

An antenna terminal 19 for TV broadcast is provided, for example, on a right side surface of the computer main body 11. In addition, on a rear surface of the computer main body 11, there is provided an external display connection terminal corresponding to, e.g. HDMI (high-definition multimedia interface) standard. The external display connection terminal is used to output video data (motion video data), which is included in video content data such as broadcast program data, to an external display.

Referring now to FIG. 2, the system configuration of the computer 10 is described.

As shown in FIG. 2, the computer 10 includes a CPU 101, a north bridge 102, a main memory 103, a south bridge 104, a graphics processing unit (GPU) 105, a video memory (VRAM) 105A, a sound controller 106, a BIOS-ROM 109, a LAN controller 110, a hard disk drive (HDD) 111, a DVD drive 112, a video processor 113, a memory 113A, a wireless LAN controller 114, an IEEE 1394 controller 115, an embedded controller/keyboard controller IC (EC/KBC) 116, a TV tuner 117, and an EEPROM 118.

The CPU 101 is a processor which controls the operation of the computer 10. The CPU 101 executes an operating system (OS) 201 and various application programs such as a TV application program 202, which are loaded from the hard disk drive (HDD) 111 into the main memory 103. The TV application program 202 is software for executing the TV function. The TV application program 202 executes, for example, a live process for viewing/listening to broadcast program data which is received by the TV tuner 117, a recording process for recording broadcast program data in the HDD 111, and a playback process for playing back recorded broadcast program data/video data. The CPU 101 also executes a system BIOS (Basic Input/Output System) that is stored in the BIOS-ROM 109. The system BIOS is a program for hardware control.

The north bridge 102 is a bridge device that connects a local bus of the CPU 101 and the south bridge 104. The north bridge 102 includes a memory controller that access-controls the main memory 103. The north bridge 102 has a function of executing communication with the GPU 105 via, e.g. a PCI EXPRESS serial bus.

The GPU 105 is a display controller for controlling the LCD 17 that is used as a display monitor of the computer 10. A display signal, which is generated by the GPU 105, is sent to the LCD 17. In addition, the GPU 105 can send a digital video signal to an external display device 1 via an HDMI control circuit 3 and an HDMI terminal 2.

The HDMI terminal 2 is the above-mentioned external display connection terminal. The HDMI terminal 2 can send both a non-compressed digital video signal and a digital audio signal via a single cable to the external display device 1 such as a TV. The HDMI control circuit 3 is an interface for sending the digital video signal to the external display device 1, which is called "HDMI monitor", via the HDMI terminal 2.

The south bridge 104 controls the devices on an LPC (Low Pin Count) bus, and the devices on a PCI (Peripheral Component Interconnect) bus. In addition, the south bridge 104 includes an IDE (Integrated Drive Electronics) controller for controlling the hard disk drive (HDD) 111 and DVD drive 112. The south bridge 104 also includes a function of executing communication with the sound controller 106.

Further, the video processor 113 is connected to the south bridge 104 via, e.g. a PCI EXPRESS serial bus.

The video processor 113 is a processor which executes various processes relating to the above-described video indexing. The video processor 113 functions, for example, as a face image extraction unit for executing a face image extraction process. Specifically, in the face image extraction process, the video processor 113 extracts face images of persons from a plurality of frames which constitute video content data, and outputs, e.g. time stamp information indicating time points at which the extracted face images appear. The extraction of face images is executed, for example, by a face detection process for detecting a face region from each frame, and a cut-out process (trimming process) for cutting out the detected face region from the frame. The detection of the face region can be executed, for example, by analyzing the characteristics of the image of each frame and searching for a region having characteristics similar to those of a pre-prepared face image characteristic sample. The face image characteristic sample is characteristic data which is obtained by statistically processing face image characteristics of a plurality of persons. The memory 113A is used as a working memory of the video processor 113.

A great deal of arithmetic operations are required for executing the face image extraction process. In the present embodiment, the video processor 113, which is a dedicated processor and differs from the CPU 101, is used as a back-end processor, and the video processor 113 executes the face image extraction process. Therefore, the face image extraction process can be executed without increasing the load on the CPU 101.

The sound controller 106 is a sound source device, and outputs audio data, which is to be played back, to the speakers 18A, 18B or to the HDMI control circuit 3.

The wireless LAN controller 114 is a wireless communication device which executes wireless communication of, e.g. IEEE 802.11 standard. The IEEE 1394 controller 115 executes communication with an external device via an IEEE 1394 serial bus.

The embedded controller/keyboard controller IC (EC/KBC) 116 is a 1-chip microcomputer in which an embedded controller for power management and a keyboard controller for controlling the keyboard (KB) 13 and touch pad 16 are integrated. The embedded controller/keyboard controller IC (EC/KBC) 116 has a function of powering on/off the computer 10 in response to the user's operation of the power button 14. Further, the embedded controller/keyboard controller IC (EC/KBC) 116 has a function of executing communication with the remote-control unit interface 20.

The TV tuner 117 is a receiving device which receives broadcast program data that is broadcast by a television (TV) broadcast signal, and is connected to the antenna terminal 19. For example, the TV tuner 117 is realized as a digital TV tuner which can receive digital broadcast program data such as ground wave digital TV broadcast program data. The TV tuner 117 also has a function of capturing video data which is input from an external device.

Figure 3:
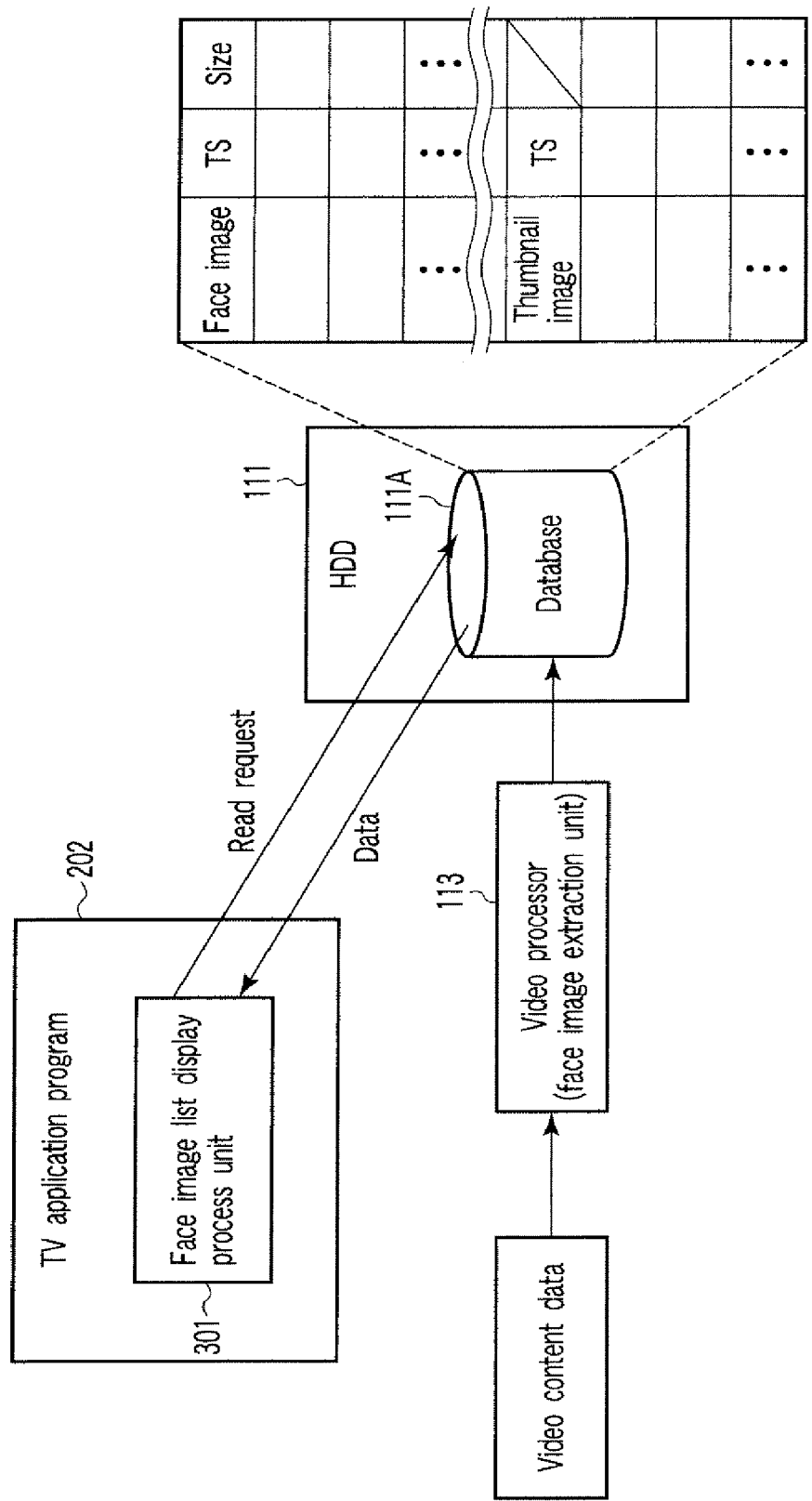
FIG. 3 is an exemplary block diagram for describing a face image list display function of the electronic apparatus according to the embodiment.

Next, referring to FIG. 3, a description is given of a face image list display function which is executed by the TV application program 202.

The face image extraction process for video content data such as broadcast program data is executed by the video processor 113, as described above. Under the control of the TV application program 202, the video processor 113 executes the face image extraction process, for example, on video content data, such as recorded broadcast program data, which is designated by the user. In addition, the video processor 113 can execute, in parallel with the recording process for storing in the HDD 111 broadcast program data which is received by the TV tuner 117, the face image extraction process on this broadcast program data.

In the face image extraction process, the video processor 113 analyzes, in units of a frame, video content data that is composed of motion video data. The video processor 113 extracts face images of persons from a plurality of frames which constitute video content data, and outputs time stamp information indicating time points at which the extracted face images appear. As the time stamp information corresponding to each face image, use may be made of, for instance, an elapsed time from the beginning of video content data to the appearance of the face image, or the frame number of a frame from which the face image is extracted.

Further, the video processor 113 outputs a size (resolution) of each of the extracted face images. The face detection result data (face image, time stamp information TS, and size), which is output from the video processor 113, is stored in a database 111A as indexing data. The database 111A is a storage area which is provided in the HDD 111 for storing indexing data.

The video processor 113 further executes a thumbnail image acquisition process in parallel with the face image extraction process. A thumbnail image is an image (or may be a reduced image) corresponding to each of a plurality of frames which are extracted at equal time intervals from the video content data. Specifically, the video processor 113 extracts frames at predetermined equal time intervals from the video content data, regardless of whether the frames include faces images or not, and outputs images (thumbnail images) corresponding to the extracted frames and the time stamp information TS indicative of time points at which the thumbnail images appear. The thumbnail image acquisition result data (thumbnails, time stamp information TS), which is output from the video processor 113, is also stored in the database 111A as indexing data.

The TV application program 202 includes a face image list display process unit 301 for executing the face image list display function. The face image list display process unit 301 reads out the face detection result data (face images, time stamp information TS, and size) from the database 111A, and displays, with use of the face detection result data, a list of face images of persons, who appear in the video content data, on a two-dimensional display area (hereinafter referred to as "face thumbnail display area"). In this case, the face image list display process unit 301 divides a total time length of video content data into a plurality of time zones at equal time intervals, and selects a predetermined number of face images appearing in each time zone from the extracted face images. The face image list display process unit 301 displays the selected predetermined number of face images, in units of a time zone, by arranging the face images in the order of appearance of the face images.

Specifically, the two-dimensional face thumbnail display area includes a plurality of face image display areas which are arranged in a matrix including a plurality of rows and a plurality of columns. A plurality of time zones each having the same time length, which are obtained by dividing a total time length of the video content data by the number of the plurality of columns at equal intervals, are allocated to the plurality of columns, respectively. On the basis of the time stamp information TS corresponding to each face image, the face image list display process unit 301 displays face images, which belong to the time zone allocated to each column, on the face image display areas of each column, by arranging the face images in the order of time of appearance. The number of the face image display areas of each column is equal to the number of rows.

By this face image list display function, it becomes possible to present, to the user, which persons appear in which time zones in the whole video content data, and in what order. Specific structure examples of the face thumbnail display areas will be described later with reference to FIG. 5 and the following Figures.

In addition, the face image list display process unit 301 reads out the thumbnail image acquisition result data (thumbnails, time stamp information TS) from the database 111A, and displays, with use of the thumbnail image acquisition result data, the thumbnail images on a thumbnail display area (hereinafter referred to as "bellows thumbnail display area") which is disposed on an upper side or a lower side of the face thumbnail display area, by arranging the thumbnail images in line in the order of time of appearance.

Depending on video content data, there is a time zone in which no face image appears. Thus, by displaying the thumbnail display area as well as the face thumbnail display area, it is possible to present to the user the content of video content data in the time zone in which no face image appears.

Figure 4:
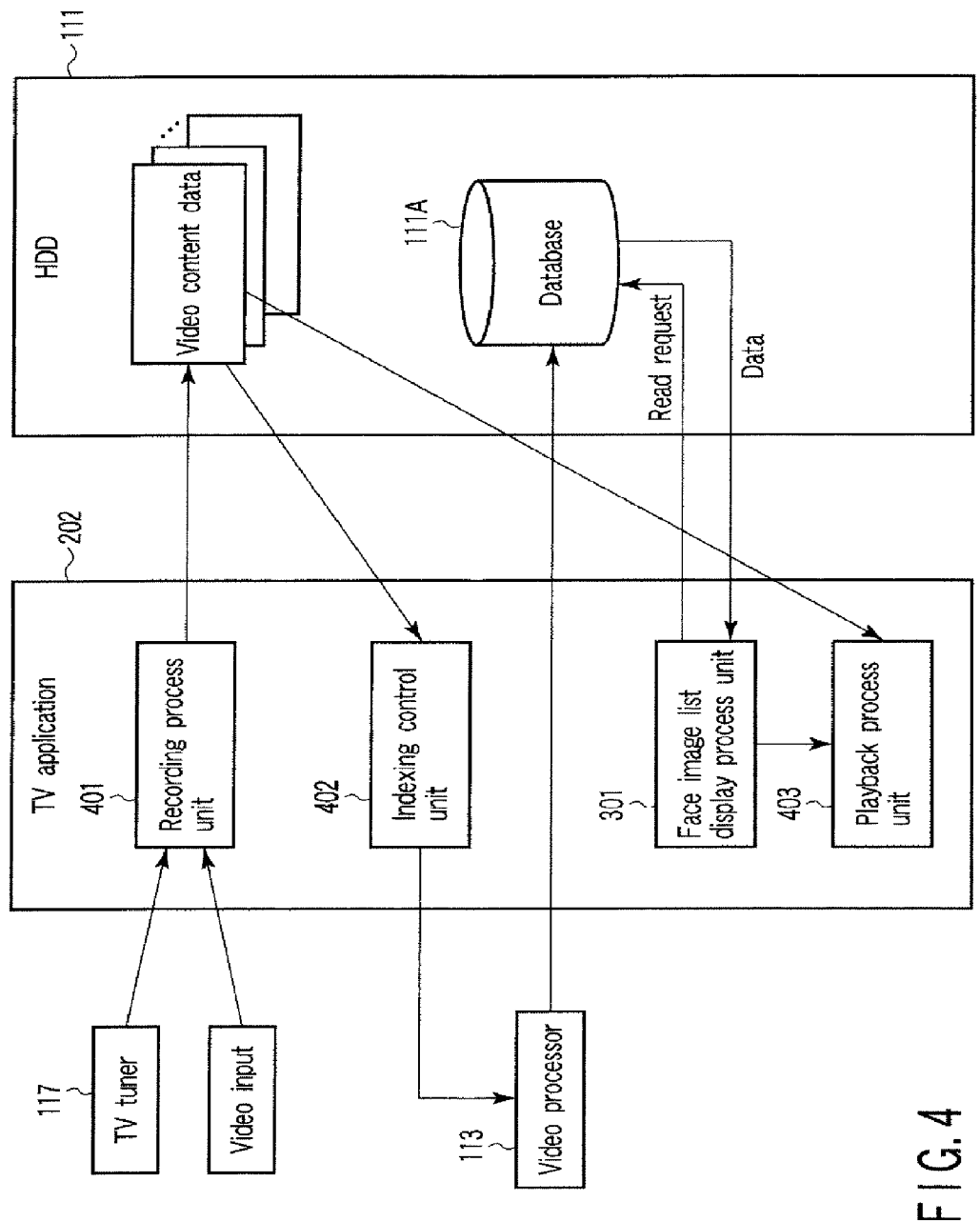
FIG. 4 is an exemplary block diagram showing the functional configuration of a program which is used in the electronic apparatus according to the embodiment.

Next, referring to FIG. 4, the functional configuration of the TV application program 202 is described.

The TV application program 202 includes, in addition to the above-described face image list display process section 301, a recording process unit 401, an indexing control unit 402 and a playback process unit 403.

The recording process unit 401 executes a recording process for recording in the HDD 111 broadcast program data which is received by the TV tuner 117 or video data which is input from an external device. In addition, the recording process unit 401 executes a programmed-recording process for receiving, with use of the tuner 117, broadcast program data which is designated by programmed-recording information (channel number, date/time) that is preset by the user, and recording the received broadcast program data in the HDD 111.

The indexing control unit 402 controls the video processor 113 and causes the video processor 113 to execute processes (face image extraction process, thumbnail image acquisition process) for video indexing. The user can designate whether the indexing process is to be executed or not, in association with each broadcast program data that is to be recorded. For example, as regards broadcast program data to be recorded, for which execution of the indexing process has been instructed, the indexing process is automatically started after the broadcast program data is recorded in the HDD 111. Besides, the user may designate video content data, from among the video content data already stored in the HDD 111, for which the indexing process is to be executed.

The playback process unit 403 executes a process for playing back each video content data stored in the HDD 111. The playback process unit 403 has such a function that when a playback instruction event is input by a user operation in the state in which one of face images in the face image list of certain video content data is selected, the playback process unit 403 starts playback of the video content data from a time point that is a predetermined time before a time point at which the selected face image appears.

Figure 5:
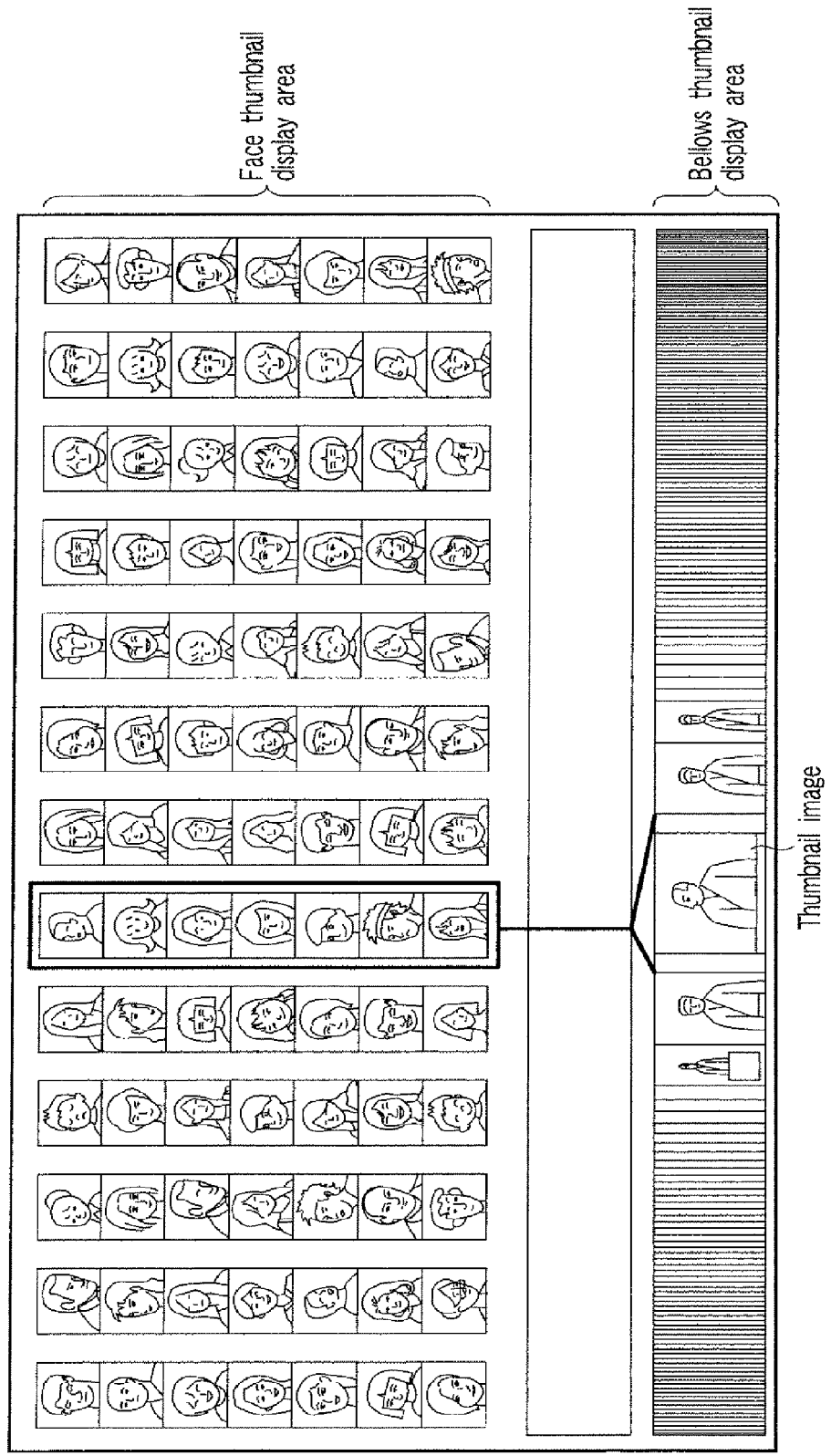
FIG. 5 shows an example of an indexing view screen which is displayed on a display device by electronic apparatus according to the embodiment.
Figure 6:
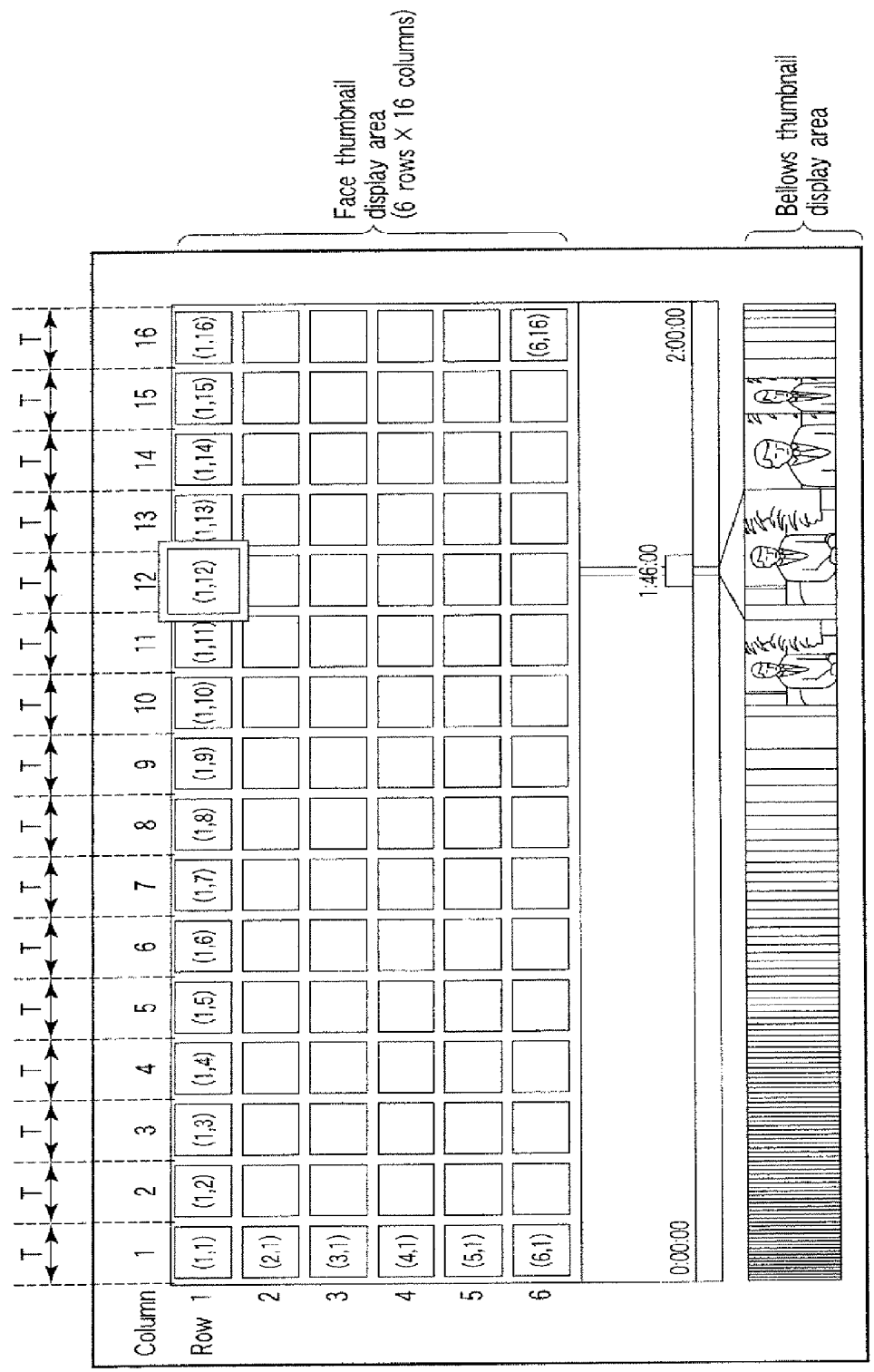
FIG. 6 shows a structure example of a face thumbnail display area which is included in the indexing view screen shown in FIG. 5.
Figure 7:
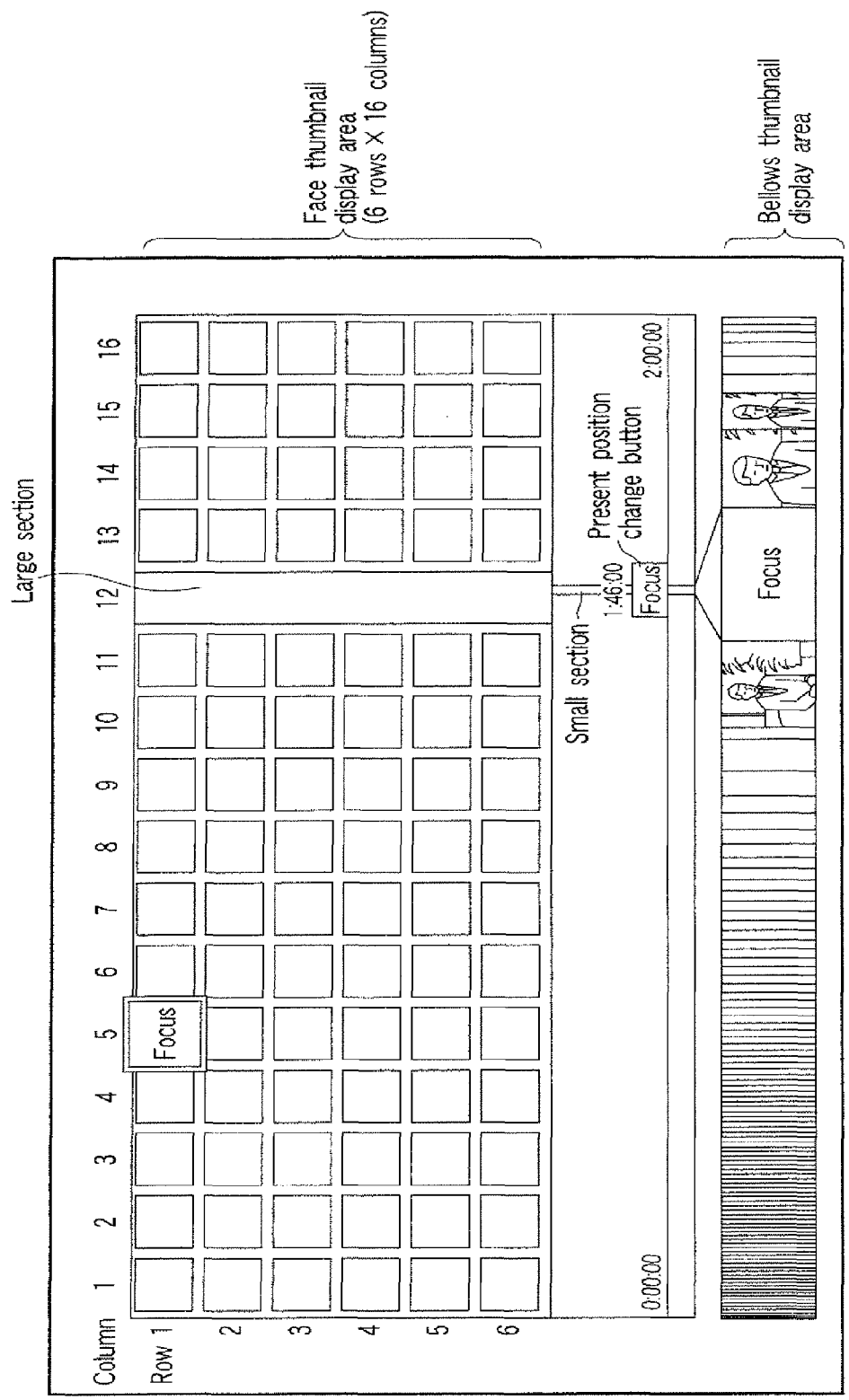
FIG. 7 is an exemplary view for explaining the relationship between the face thumbnail display area and a bellows thumbnail display area, which are included in the indexing view screen shown in FIG. 5.

Next, referring to FIG. 5 to FIG. 7, specific structures of the face thumbnail display area are described.

FIG. 5 shows an example of an indexing view screen which is displayed on the LCD 17 by the face image list display process unit 301. The indexing view screen displays a list of face images and a list of thumbnail images. Both the list of face images and the list of thumbnail images are obtained by subjecting certain broadcast program data to an indexing process. The indexing view screen includes the above-described face thumbnail display area for displaying the list of face images, and the above-described bellows thumbnail display area for displaying the list of thumbnail images in a bellows format.

The term "bellows format", in this context, is a display format in which a selected thumbnail image is displayed in a normal size and other thumbnail images are displayed in laterally reduced sizes. In FIG. 5, a thumbnail image, which has a greater distance from a selected thumbnail image, is more reduced in its lateral size.

FIG. 6 shows an example of the structure of the face thumbnail display area.

The face thumbnail display area includes a plurality of face image display areas which are arranged in a matrix including a plurality of rows and a plurality of columns. In FIG. 6, the face thumbnail display area comprises 6 rows×16 columns. The number of face image display areas included in the face thumbnail display area is 96.

A plurality of time zones, each of which has the same time length T that is obtained by dividing the total time length of video content data by the number of columns (16) at equal time intervals, are allocated to columns 1 to 16, respectively.

For example, if the total time length of video content data is two hours, the two hours are divided into 16 time zones at equal time intervals. In this case, the time length T of each time zone is 7.5 minutes. For example, a time zone from 0:00:00 (the beginning) to 0:07:30 is allocated to column 1, a time zone from 0:07:30 to 0:15:00 is allocated to column 2, and a time zone from 0:15:00 to 0:22:30 is allocated to column 3. The time length T of each time zone varies in accordance with the total time length of video content data.

On the basis of time stamp information corresponding to face images which are extracted by the video processor 113, the face image list display process unit 301 displays the face images, which belong to the time zone allocated to each column, on the six face image display areas of the associated column by arranging the six face images from the upper side to the lower side in the order of time of appearance. In this case, the face image list display process unit 301 selects face images, the number of which is equal to the number of rows (six), from the face images that belong to the time zone allocated to the column that is the object of the display process, and arranges and displays the selected face images, the number of which is equal to the number of rows.

As has been described above, in the face thumbnail display area, a time axis, having a left end position (1, 1) as a base point and a right end position (6, 16) as an end point of video content data, is used.

The user can select the size of the face image, which is displayed on each face image display area of the face thumbnail display area, from among "large", "medium" and "small". The number of rows and the number of columns are varied in accordance with the size of the face image which is selected by the user. The relationship between the size of the face image and the numbers of rows and columns is as follows.

(1) "large": 3 rows×8 columns
(2) "medium": 6 rows×16 columns
(3) "small": 10 rows×24 columns.

In the case of "large", each face image is displayed with a size of, e.g. 180×180 pixels. In the case of "medium", each face image is displayed with a size of, e.g. 90×90 pixels. In the case of "small", each face image is displayed with a size of, e.g. 60×60 pixels. The default face image size is set at, for example, "medium".

Each face image in the face thumbnail display area is set in one of two states, namely, a non-selected "standard" state and a selected "focus" state. The size of the face image in the "focus" state is set to be greater than the size of the face image in the "standard" state (180×180, 90×90, or 60×60). In FIG. 6, the face image at coordinates (1, 12) is in the "focus" state.

The number of thumbnail images, which are displayed in the bellows thumbnail display area, is set at one of 240, 144, 96 and 48 in accordance with the user setting. The default value is, e.g. 240.

The thumbnail image is set in one of two states, namely, a non-selected "standard" state and a selected "focus" state. The size of the thumbnail image in the "focus" state is set to be greater than the size of the other thumbnail images.

Next, referring to FIG. 7, the relationship between the face thumbnail display area and the bellows thumbnail display area is described.

A set of face image display areas belonging to the same column, that is, each column in the face thumbnail display area, is referred to as "large section". Each of divisions of the "large section" is referred to as "small section". The number of small sections included in one large section is given by a quotient of the number of thumbnail images displayed in the bellows thumbnail display area, which are divided by the number of columns of the face thumbnail display area. For example, if the face thumbnail display has a size of 6 rows×16 columns and the number of thumbnail images displayed in the bellows thumbnail display area is 240, the number of small sections included in one large section is 15 (=240÷16).

One large section includes 15 small sections. In other words, 15 thumbnail images belong to the time zone corresponding to one large section.

When a certain thumbnail image on the bellows thumbnail display area is selected, the face image list display process section 301 selects, on the basis of time stamp information of the selected thumbnail image, a column (large section) from plural columns (plural large sections) in the face thumbnail display areas, to which the time zone to which the selected thumbnail image belongs is allocated. The selected large section is a large section which includes the selected thumbnail image as a small section. The face image list display process section 301 displays with emphasis the selected large section.

Further, the face image list display process section 301 displays a vertical bar which connects the selected thumbnail image and the selected large section. The vertical bar is used in order to indicate to which of the 15 small sections, which are included in the selected large section, the small section corresponding to the selected thumbnail image corresponds. The vertical bar is displayed at the position of that small section of the 15 small sections included in the selected large section, which corresponds to the selected thumbnail image. For example, if the selected thumbnail image is the first image of the 15 thumbnail images belonging to the time zone corresponding to a certain large section, that is, the image corresponding to the first small section of the large section, the selected thumbnail image is connected to the left end of the large section by the vertical bar. On the other hand, for example, if the selected thumbnail image is the last image of the 15 thumbnail images belonging to the time zone corresponding to a certain large section, that is, the image corresponding to the last small section of the large section, the selected thumbnail image is connected to the right end of the large section by the vertical bar.

As has been described above, when a thumbnail image on the bellows thumbnail display area is selected, a column (large section), to which the time zone to which the selected thumbnail image belongs is allocated, is automatically selected from a plurality of columns in the face thumbnail display area. Thereby, the user can recognize to which of columns (large sections) in the face thumbnail display area the selected thumbnail image corresponds. Further, by the vertical bar, the user can also recognize to which time point in which column (large section) the selected thumbnail image corresponds.

Furthermore, the face image list display process unit 301 displays, on the basis of the time stamp information of the selected thumbnail image, the time information on the indexing view screen, which indicates the time point at which the selected thumbnail image appears.

A "present position change" button is an operation button for changing a thumbnail image which is selected. If the user operates a left cursor key or a right cursor key on the keyboard 13 in the stated in which the "present position change" button is focused, the thumbnail image to be selected is shifted to the left or right, for example, in units of one small section.

Figure 8:
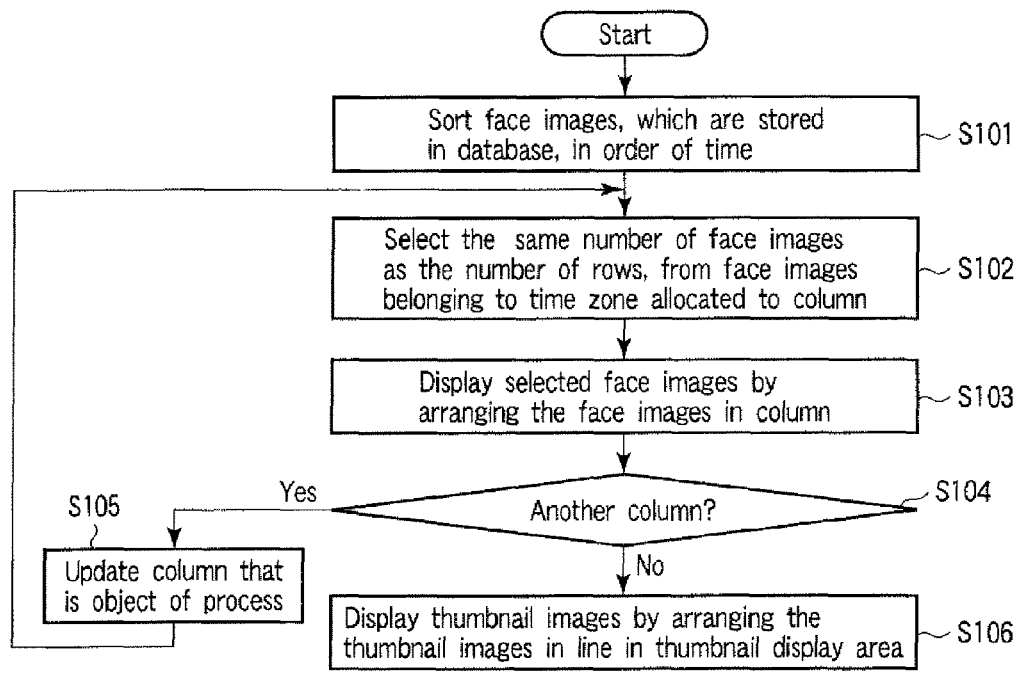
FIG. 8 is an exemplary flow chart illustrating an example of the procedure of a face image list display process which is executed by the electronic apparatus according to the embodiment.

Next, referring to a flow chart of FIG. 8, a description is given of the procedure of the display process which is executed by the face image list display process unit 301.

To start with, the face image list display process unit 301 sorts face images stored in the database 111A, on the basis of time stamp information corresponding to these face images, in an order of time of appearance of the face images (step S101). Then, the face image list display process unit 301 determines the number of rows and the number of columns in accordance with a face image size which is designated by the user, and calculates a time zone which is allocated to each column (large section), by equally dividing the total time length of video content data, which is an object of indexing, by the number of columns. Then, the face image list display process unit 301 selects that number of face images, which is equal to the number of rows, from the face images belonging to the time zone which is allocated to the column that is the object of the display process (step S102). If the number of face images belonging to the time zone, which is allocated to the column that is the object of the display process, is larger than the number of rows, the face image list display process unit 301 preferentially selects face images which, for example, are earlier in the order of time of appearance.

Instead of the preferential selection of face images which are earlier in the order of time of appearance, the face image list display process unit 301 may preferentially select face images with high frequency of appearance.

Figure 9:
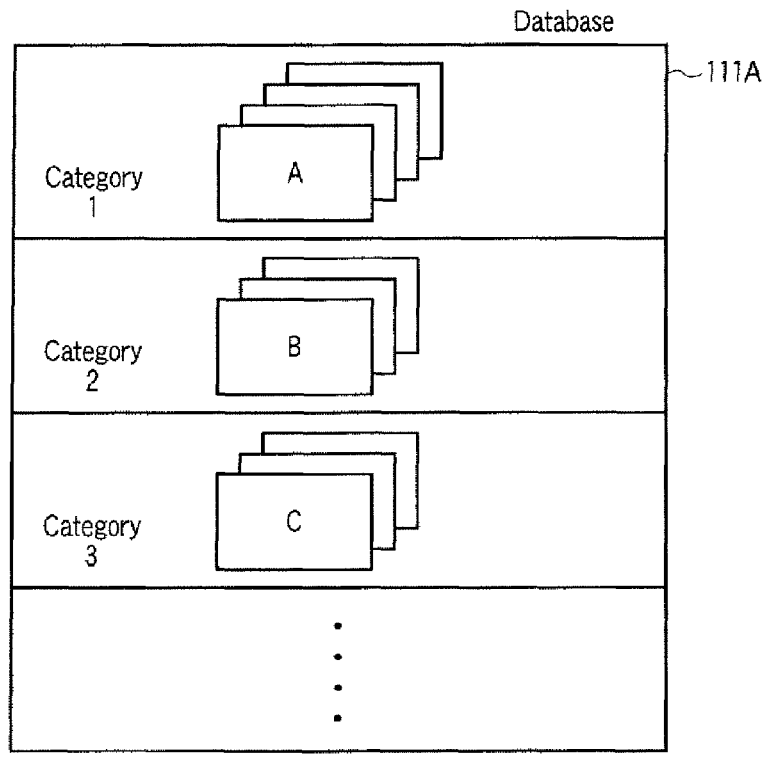
FIG. 9 shows a state in which face images are classified into categories by the electronic apparatus according to the embodiment.

In this case, the face image list display process unit 301 preferentially selects, from the face images belonging to a time zone allocated to the column that is the object of the display process, face images with high frequency of appearance in this time zone. For example, the video processor 113 may classify face images of the same person into the same category, on the basis of the correlation between characteristic data of extracted face images. In this case, as shown in FIG. 9, the face images are classified on a person-by-person basis (i.e. on a category-by-category basis), and stored in the database 111A. In FIG. 9, category 1 represents a set of face images of a person A, category 2 represents a set of face images of a person B, and category 3 represents a set of face images of a person C. The face image list display process unit 301 preferentially selects the face images of the persons with high frequency of appearance.

In the case where the number of face images belonging to the time zone, which is allocated to the column that is the object of the display process, is larger than the number of rows, the face image list display process unit 301 may preferentially select face images with large sizes, from the face images belonging to the time zone allocated to the column that is the object of the display process, on the basis of size information of each face image which is stored in the database 111A.

The size of a face image, which is extracted from a frame showing a close-up face, is relatively large. Accordingly, as the size of the extracted face image is larger, it is highly possible that the person of the extracted face image is of higher importance. By preferentially selecting a face image with a larger size, it becomes possible to preferentially display a face image of a person who is of high importance.

Subsequently, the face image list display process unit 301 displays selected face images on a plurality of face image display areas in the column that is the object of the display process, by arranging the face images in the order of time of appearance (step S103). A face image with an earlier time of appearance is displayed on a more upward face image display area, and a face with a later time of appearance is displayed on a more downward face image display area.

The process of steps S102 and S103 is repeatedly executed until the processing on all columns is completed, while the column that is the object of the display process is updated (step S104, S105).

If the number of face images belonging to the time zone, which is allocated to the column that is the object of the display process, is less than the number of rows, thumbnail images belonging to the corresponding time zone may also be displayed in the column that is the object of the display process.

If the process on all columns is completed (NO in step S104), the face image list display process unit 301 displays the thumbnail images, which are stored in the database 111A, on the bellows thumbnail display area on the basis of the time stamp information of the thumbnail images, by arranging the thumbnail images in line in the order of time of appearance of the thumbnail images (step S106).

Figure 10:
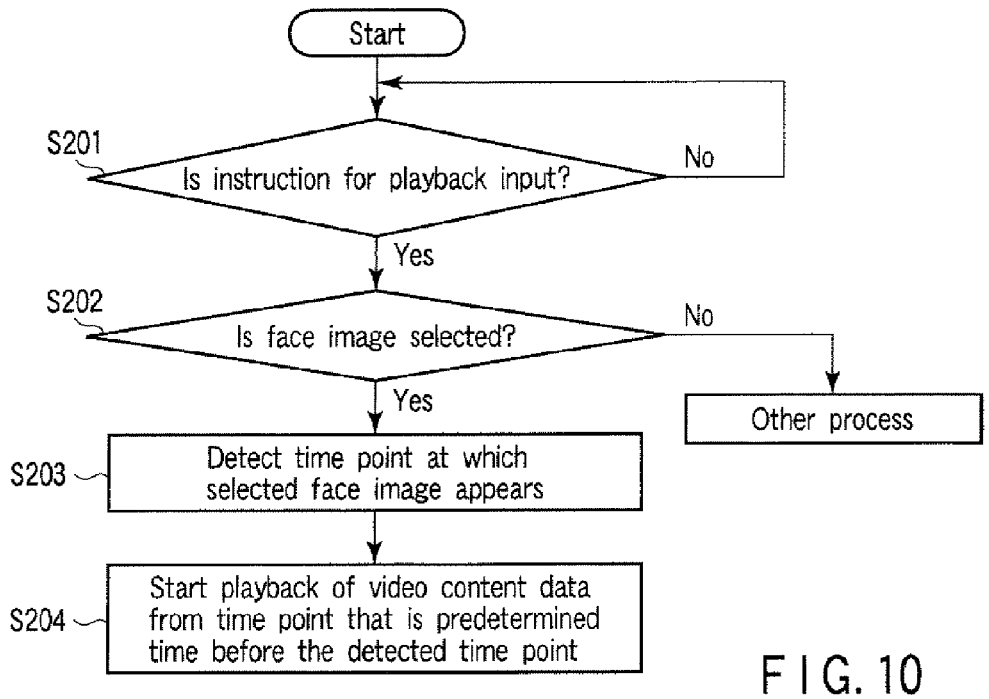
FIG. 10 is an exemplary flow chart illustrating an example of the procedure of a playback process which is executed by the electronic apparatus according to the embodiment.

Next, referring to a flow chart of FIG. 10, a description is given of the procedure of a playback process which is executed by the playback process unit 403.

When an event of instructing playback of video content data is input in accordance with a user operation (YES in step S201), the playback process unit 403 cooperates with the face image list display process unit 301 and determines whether a face image on the face thumbnail display area for the video content data is selected or not (step S202). If there is a face image which is selected (YES in step S202), the playback process unit 403 detects a time point at which the selected face image appears, on the basis of the time stamp information of the selected face image (step S203). The playback process unit 403 starts playback of the video content data from a time point which is a predetermined time before the detected time point, for example, from a time point which is two seconds before (step S204).

When an invent of instructing playback of the video content data is input in the state in which a certain thumbnail image on the bellows thumbnail display area is selected, the playback process unit 403 starts, on the basis of the time stamp information of the selected thumbnail image, playback of video content data from a time point which is a predetermined time before the detected time point at which the selected thumbnail image appears, for example, from a time point which is two seconds before.

Figure 11:
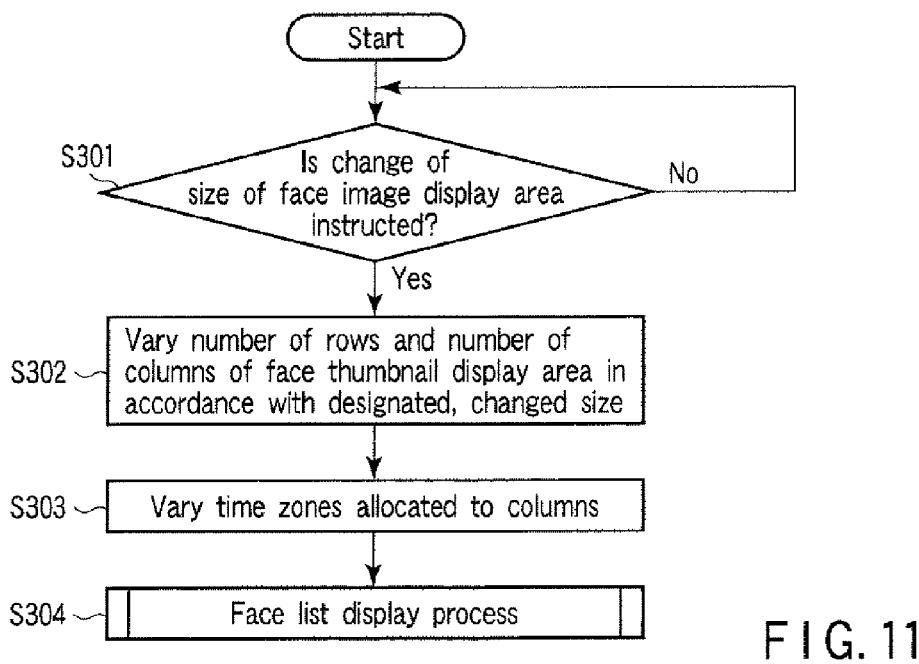
FIG. 11 is an exemplary flow chart illustrating an example of the procedure of a process for varying the number of rows and the number of columns in the face thumbnail display area, which is executed by the electronic apparatus according to the embodiment.

Next, referring to a flow chart of FIG. 11, a description is given of the procedure of a process which is executed by the face image list display process unit 301 in a case where a change of the face image size is instructed by the user.

If a change of the face image size, that is, a change of the size of the face image display area, is instructed by the user, for example, in the state in which the indexing view screen is displayed (YES in step S301), the face image list display process unit 301 varies the number of rows and the number of columns of the face thumbnail display area in accordance with a designated, changed face image size (step S302). Then, the face image list display process unit 301 varies the time zones which are allocated to the columns in the face thumbnail display area, on the basis of the total time length of the video content data and the varied number of columns (step S303). In step S303, the face image list display process unit 301 determines the time zones allocated to the respective columns, by dividing the total time length of the video content data by the varied number of columns. On the basis of the time zones allocated to the respective columns and the varied number of rows, the face image list display process unit 301 executes the face list display process which has been described with reference to steps S101 to S105 in FIG. 8 (step S304).

As has been described above, in the present embodiment, the list of face images of persons, which are acquired from the video content data, are displayed on the face thumbnail display area of the indexing view screen. In this case, a plurality of time zones each having the same time length, which are obtained by dividing the total time length of the video content data by the number of columns at equal intervals, are allocated to a plurality of vertically elongated columns (a plurality of large sections) which are arranged and displayed along the horizontal axis of the face thumbnail display area. In each of the columns, the face images belonging to the time zone allocated to this column are displayed in such a manner that the face images are arranged in the order of time of appearance of the face images. Face images of a person, who appears only in a certain time zone, are displayed only in the column (large section) corresponding to this time zone. On the other hand, face images of a person, who appears in some time zones, are displayed in some columns (large sections) corresponding to these time zones. It is thus possible to easily understandably present, to the user, which person appears in which time zone of video content data, and in what order of appearance, over the entire video content data. Therefore, the user can easily understand, without playing back each recorded video content data, in which time zone in the whole video content data each of persons appears.

In addition, in the present embodiment, when an event of instructing a change of the size of each face image display area (face image display size) is input, the number of columns included in the face thumbnail display area is automatically varied in accordance with the changed size that is designated by the event, and the time zones that are allocated to the columns included in the face thumbnail display area are also automatically varied on the basis of the total time length of the video content data and the varied number of columns. Therefore, even in the case where the face image display size is changed by the user, it is possible to present, to the user, in which time zone in the whole video content data each person appears.

Depending on video content data, in some cases, there is a time zone in which no person appears. In the present embodiment, however, the bellows thumbnails, as well as the face thumbnails, are displayed. Thus, even in the time zone in which no person appears, the content of video content data in that time zone can be presented to the user.

The procedure of the record programming process of the present embodiment can all be realized by software. Therefore, by installing the software in an ordinary computer via a computer-readable memory medium, the same advantageous effects as in the present embodiment can easily be realized.

The electronic apparatus of the present embodiment can be realized by not only the computer 10, but also by various consumer electronic apparatuses such as an HDD recorder, a DVD recorder and a TV apparatus. In this case, the functions of the TV application program 202 can be realized by hardware such as a DSP or a microcomputer.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
an image extraction module configured to extract representative images from a plurality of frames which constitute video content data, and to output time stamp information indicative of time points at which the extracted representative images appear; and
an image list display process module configured to display a list of the extracted representative images on a two-dimensional display area, the two-dimensional display area includes a plurality of image display areas that are arranged in a matrix including a plurality of rows and a plurality of columns, wherein a plurality of time zones, which are obtained by dividing a time length of the video content data by the number of the plurality of columns, are allocated to the plurality of columns, and wherein the image list display process module is configured to display, based on the time stamp information corresponding to each of the extracted representative images, one or more extracted representative images that belong to each time zone allocated to a corresponding column of the plurality of columns on the image display areas of the column by arranging the representative images in an order of time of appearance of the representative images.

2. The electronic apparatus of claim 1 wherein the image extraction module is configured to extract face images of persons from the plurality of frames which constitute video content data, as the representative images.

3. The electronic apparatus of claim 1, wherein the image list display process module is configured to select, based on the time stamp information corresponding to each of the extracted representative images, the same number of representative images as the number of rows from the representative images which belong to the time zone allocated to the column that is an object of a display process, and to display the same number of selected representative images as the number of rows on the image display areas in the column that is the object of the display process, by arranging the representative images in the order of time of appearance of the representative images.

4. The electronic apparatus of claim 3, wherein in a case where the number of representative images belonging to the time zone, which is allocated to the column that is the object of the display process, is larger than the number of rows, the image list display process module preferentially selects, from the representative images belonging to the time zone allocated to the column that is the object of the display process, representative images with high frequency of appearance in this time zone.

5. The electronic apparatus of claim 3, wherein in a case where the number of representative images belonging to the time zone, which is allocated to the column that is the object of the display process, is larger than the number of rows, the image list display process module preferentially selects, from the representative images belonging to the time zone allocated to the column that is the object of the display process, representative images with a large size.

6. The electronic apparatus of claim 1, wherein when an event of instructing a change of a size of each of the image display areas is input, the image list display process module varies the number of rows and the number of columns included in the two-dimensional display area in accordance with a changed size that is designated by the event, and varies the time zones that are allocated to the columns included in the two-dimensional display area based on the total time length of the video content data and the varied number of columns.

7. The electronic apparatus of claim 1, wherein the image list display process module displays a plurality of thumbnail images, which correspond to a plurality of frames extracted from the video content data at equal time intervals, on a thumbnail display area which is disposed on an upper side or a lower side of the two-dimensional display area, by arranging the thumbnail images in line, and selects, in a case where a certain thumbnail image on the thumbnail display area is designated by a user, that one of the plurality of columns in the two-dimensional display area, to which the time zone to which the designated thumbnail image belongs is allocated.

8. The electronic apparatus of claim 1, further comprising a playback process module configured to start, when an invent of instructing playback of the video content data is input in a state in which one of the representative images displayed on the two-dimensional display area is selected, playback of the video content data, based on the time stamp information of the selected representative image, from a time point which is a predetermined time before a time point at which the selected representative image appears.

9. An image display method of displaying a list of images of appearing in video content data, comprising:

performing an image extraction process of extracting representative images from a plurality of frames which constitute the video content data and outputting time stamp information indicative of time points at which the extracted representative images appear; and performing an image list display process of displaying a list of representative images, which appears in the video content data, on a two-dimensional display area by using the representative images extracted by the image extraction process, the two-dimensional display area includes a plurality of image display areas that are arranged in a matrix including a plurality of rows and a plurality of columns, wherein a plurality of time zones, which are obtained by dividing a time length of the video content data by the number of the plurality of columns, are allocated to the plurality of columns, respectively, and the image list display process displays, based on the time stamp information corresponding to each of the extracted representative images, the representative images, which belong to the time zone allocated to each column, on the image display areas of each column, by arranging the representative images in an order of time of appearance of the representative images.

10. The image display method of claim 9, wherein the image extraction process including extracting face images of persons from the plurality of frames which constitute video content data, as the representative images.

11. A computer-readable, non-transitory storage medium having stored thereon a program which is executable by a computer, the program controlling the computer to execute functions of:

performing an image extraction process of extracting representative images from a plurality of frames which constitute the video content data and outputting time stamp information indicative of time points at which the extracted representative images appear; and performing an image list display process of displaying a list of representative images, which appears in the video content data, on a two-dimensional display area by using the representative images extracted by the image extraction process, the two-dimensional display area includes a plurality of image display areas that are arranged in a matrix including a plurality of rows and a plurality of columns, wherein a plurality of time zones, which are obtained by dividing a time length of the video content data by the number of the plurality of columns, are allocated to the plurality of columns, respectively, and the image list display process displays, based on the time stamp information corresponding to each of the extracted representative images, the representative images, which belong to the time zone allocated to each column, on the image display areas of each column, by arranging the representative images in an order of time of appearance of the representative images.

12. The computer-readable, non-transitory storage medium of claim 11, wherein the image extraction process including extracting face images of persons from the plurality of frames which constitute video content data, as the representative images.

* * * * *